June 25, 1974 — C. PARKER — 3,819,789
METHOD AND APPARATUS FOR BLOW MOLDING
AXIALLY DEFORMABLE CONTAINERS
Filed July 30, 1971
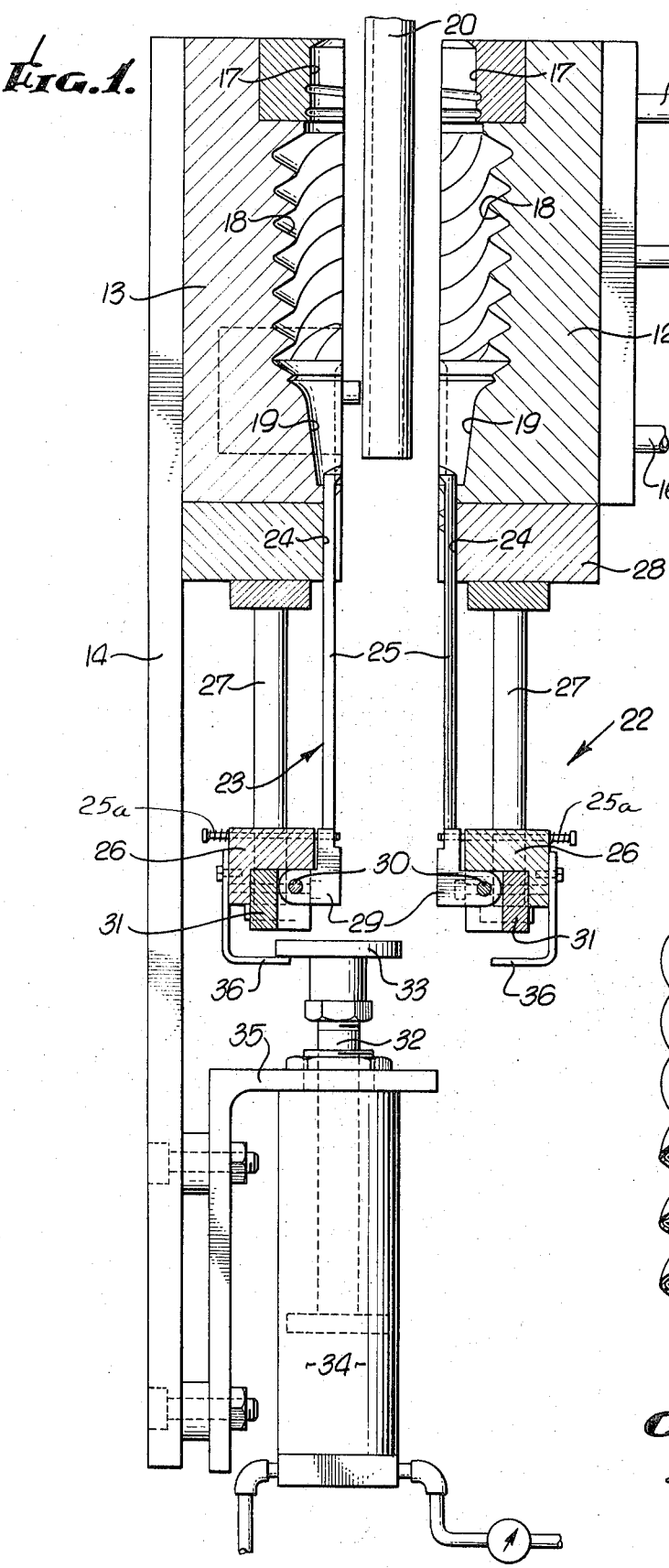
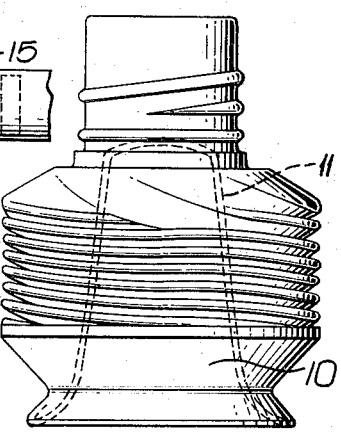
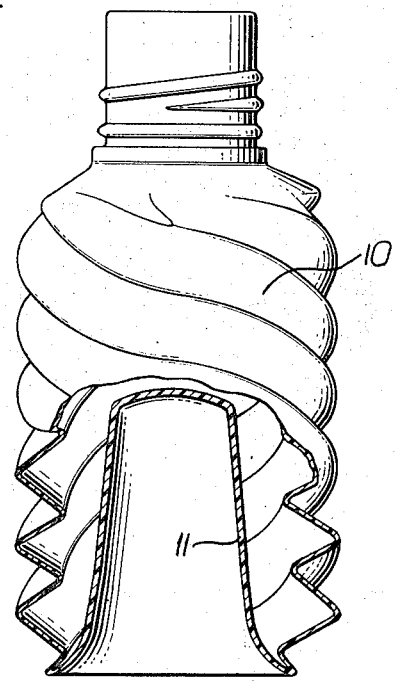
INVENTOR.
CAROL PARKER
By White & Haefliger
ATTORNEYS.

June 25, 1974  
C. PARKER  
3,819,789  
METHOD AND APPARATUS FOR BLOW MOLDING  
AXIALLY DEFORMABLE CONTAINERS  
Filed July 30, 1971  
2 Sheets-Sheet 2
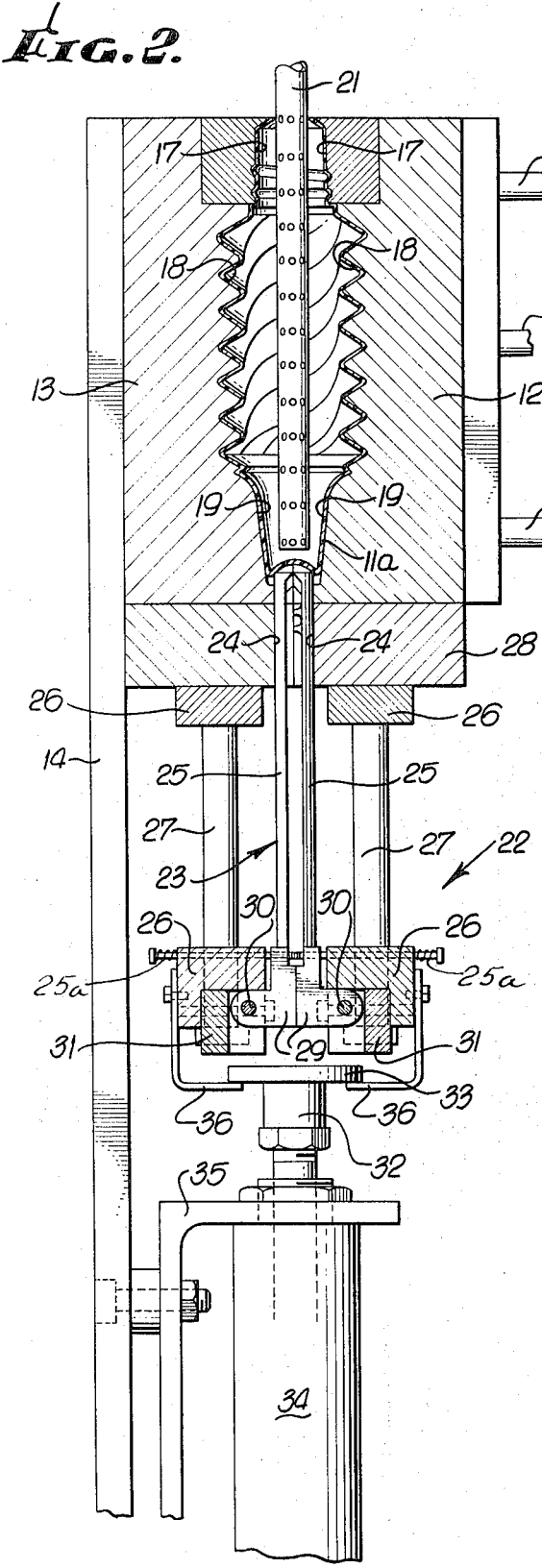
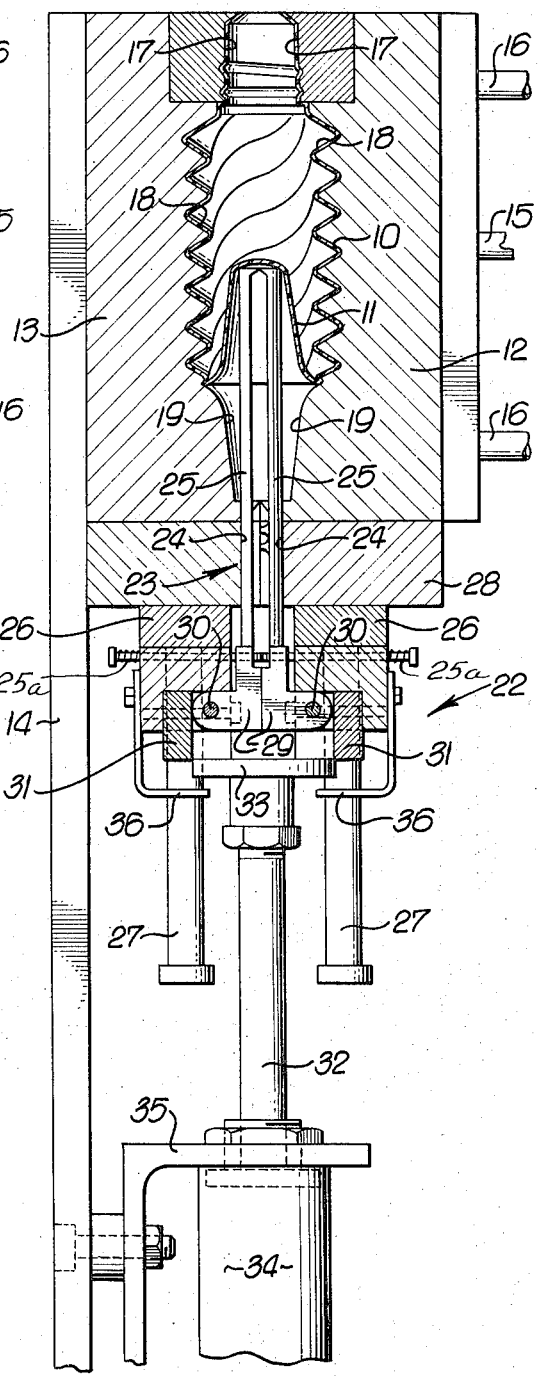
INVENTOR.  
CAROL PARKER  
By White & Haefliger  
ATTORNEYS.

United States Patent Office 3,819,789
Patented June 25, 1974

3,819,789
METHOD AND APPARATUS FOR BLOW MOLDING AXIALLY DEFORMABLE CONTAINERS
Carol Parker, 355 H Ave., Coronado, Calif. 92118
Continuation-in-part of abandoned application Ser. No. 832,257, June 11, 1969. This application July 30, 1971, Ser. No. 167,715
Int. Cl. B29c 17/07
U.S. Cl. 264—94
8 Claims

ABSTRACT OF THE DISCLOSURE

Apparatus for use in association with a mold used on a blow molding machine to produce a molded container with a bottom portion that includes a hollow expeller extending into the interior of the container. The apparatus includes an elongated forming rod. The forming rod is sectioned to separate with the mold halves and that functions to cut off the parison and form the bottom of the container. An actuator then causes the forming rod to force the bottom portion into the container inverting it and forming the expeller.

The method of forming the container includes the timing of the inversion of the expeller to take place after the blowing, and release of blowing pressure, but prior to the firming of the molded material.

CROSS REFERENCE TO RELATED APPLICATION

This application is a continuation-in-part of my application Ser. No. 832,257, filed June 11, 1969, now abandoned.

BACKGROUND OF THE INVENTION

Blow molded plastic containers, particularly bottles, have been formed with wall configurations permitting some axial compressive deformation for the expulsion of the bottle contents. Prior art axially compressible containers, have in general, not been satisfactory because their design has not permitted sufficient compression to expel all of the container's contents. A container that is fully effective in axial compression is illustrated in applicant's Pat. No. 2,899,110. This container is capable of substantially complete expulsion of its contents, when used in conjunction with the push-up or expeller there illustrated. The push-up is designed to be located in the bottom of the container and to move in close proximity to the inner diameter of the container to expel the contents progressively, eventually contacting the neck of the container to expel substantialy all of the contents. The push-up is effective for this purpose even where viscous materials are contained.

While the proposed push-up is an essential feature it has thus far been difficult or impossible to incorporate in production containers because of the complexity and expense of the forming process. For example, high production containers of plastic or other deformable material are frequently made by blow-molding. The blow molding process forces a pliable tube or parison to contact the mold walls by introducing pressure to the interior of the parison. The limits of expansion of the pliable material, together with the requirement that the container be removable from the mold after firming makes it difficult to incorporate a recess within the interior of the container. In addition, any slowing of the machine cycle time to permit additional steps has an immediate effect on cost.

It has been suggested that the container could be formed with an extension and the extension inverted after the container is removed from the mold. However, this process does not produce containers of consistent quality since the molded material has become too firm and therefore must be subjected to major stress to cause the inversion. This process results in weak and defective containers at a high cost.

Thus it would be desirable if a method and apparatus could be provided for producing a push-up or expeller without defects and without substantially increasing the cost over that for standard blow molded articles of comparable size.

SUMMARY OF THE INVENTION

The invention provides a method and apparatus for molding an axially deformable container while forming and deflecting into the container an expeller prior to the removal of the container from the mold and without substantially increasing machine cycle time.

More specifically, the invention achieves the formation and positioning of an expeller in a bottle by a blow molding sequence whereby the body of the bottle and a hollow bottom extension are simultaneously blown, the blowing pressure is released and the extension is forced upwardly into the bottle prior to the firming of the molded material.

Structurally, this mode of operation is achieved by employment of a two piece mold including a cavity, to create a push-up extension beyond the container bottom. With the mold section closed, and utilizing an elongated vertically movable forming rod to engage and deflect a closed end of the extension upwardly into the bottle a distance, such that, when the latter is fully twist-compressed, the expeller may project into the neck of the bottle.

The invention has utility in the formation of expellers in any type of deformable, moldable, containers where this function is desired. In this manner, the invention may make available to all prior art, molded compressible containers, the benefits associated with the use of such an expeller. However, the invention has particular applicability to the formation of containers by blow molding that are axially deformable, such as the spiral walled container illustrated in applicant's U.S. Pat. No. 2,899,110.

The structure peculiar to the apparatus of the invention may be incorporated with existing molding apparatus as an attachment to the mold, or may be an integral part of the mold design.

Further, details of the invention and the operation of an illustrative embodiment will be more fully understood from the following detailed description of the accompanying drawings:

BRIEF DESCRIPTION OF THE DRAWINGS

FIG. 1 is a view showing sectional blow molding equipment with the mold sections parted to receive a plastic parison.

FIG. 2 is a similar view showing the mold sections closed and at the start of upward displacement of the expeller displacing forming rod portions.

FIG. 3 is like FIG. 2 with the forming rod portions and expeller shown trust up into the bottle.

FIG. 4 is a partly sectional view showing the normal bottle configuration and its contained expeller.

FIG. 5 is a view illustrative of the bottle in collapsed condition.

DESCRIPTION OF THE PREFERRED EMBODIMENT

An exemplary embodiment of the invention is described as forming a container such as that illustrated in FIGS. 4 and 5. The bottle to be formed has configuration of multiple hollow thin wall spirals 10 which are deflectable together by relatively twisting the top and bottom of the bottle so that it compresses axially to expel the contents. During the final stages of expulsion the push-up or expeller 11 forces substantially all of the contents from the container precluding wastage of contents of a viscous or creamy nature that would tend to remain in the central interior of the bottle.

In reference to FIGS. 1 to 3, the blow molding equipment is shown to comprise a pair of mold sections 12 and 13 the latter being stationarily carried by support 14 with section 12 mounted for lateral actuation by a power source such as pressurized fluid piston and cylinder unit 15. Guides 16 may be provided for support within the suitable bearings, not shown. As will be understood the mold section interiors have recesses at 17 and 18 in keeping with the FIG. 4 shape of the bottle, as well as lower cavitations 19 in conformity with the expeller to be blown. In accordance with customary practice the open mold receives a tubular parison 20 extending beyond the lower boundary of the mold which is blown by nozzle 21 inserted after the parison to the mold configuration appearing in FIG. 2.

Associated with the mold is the mechanism generally indicated at 22 for projecting the elongated forming rod structure 23 upwardly into the mold through its bottom groove 24. The rod structure 23 comprises a pair of separable forming rod portions 25 mounted for vertical movement by carriers 26 which travel on guide rods 27 depending from the bottom mold blocks 28, the forming rod portions, being directly connected to links 29 pivoted at 30 at the inside of back-up inserts 31.

In addition to being pivotally mounted, the forming rod portions 25 are spring loaded into engagement with the respective portions of the bottom mold grooves 24 spring means 25a mounted on carriers 26. This arrangement give them a floating action so that they track along mold portions 24, maintaining contact without binding. As the mold closes the forming rod portions, terminal ends, act to pinch together and close the lower end of the parison 20. Elevation and retraction of the forming rod portions 25 is achieved by piston 32 having a flanged head 33 and operable within cylinder 34 mounted by bracket 35 to the support 14. Retraction of the forming rod portions 25 from their upwardly projected position results from engagement of the piston flange 33 with angular brackets 36 depending from the carrier sections 26.

In the container forming sequence, the parison is placed between the mold sections which are then closed to cut off the parison and form the container with the bottom extension 11a which, as shown in FIG. 2, tapers towards its lower end. When the mold is closed the parison is blown to expand it into contact with the mold. After the blowing pressure is released and while the plastic remains deformable, the piston 32 is actuated to engage its head flange 33 against the undersides of the carriers 26 and elevate the forming rod portions to the FIG. 3 position in which the forming rod portions are shown to have engaged and pushed the projection 11a upwardly into the bottle to form the push up, expeller or upwardly extending protuberance 11 which, as shown in FIG. 3, tapers towards its uper end and does not conform in shape with the vertically extending walls of the rod portions 25. Thereupon the elevator piston returns to its starting position and the mold sections open to release the blow molded bottle, carrying with them and spreading apart the forming rod portions 25 shown in FIG. 1. The entire forming operation takes place within the normal complete cycle of the molding machine for a container without a push-up, thereby conserving valuable machine time.

Having described my invention, I now claim:

1. Apparatus for molding containers comprising:
   mold means for producing a container having an extension projecting below the bottom of said container;
   said mold means comprising two separable sections;
   forming rod means for pushing and inverting said extension into the interior of said container, said forming rod means comprising separable rod portions, each associated with a mold section, and being relatively movable laterally towards and away from each other with said mold sections;
   a carrier means for each rod portion;
   means connecting each rod portion to said carrier means for lateral movement relative thereto;
   common actuator means for moving said carrier means and the connected rod portions toward and away from said mold means;
   a guideway on each mold section engaged by an associated rod portion; and
   biasing means acting on the rod portions for continuously urging each rod portion towards its associated guideway.

2. The apparatus of claim 1 wherein said biasing means comprises a spring acting between each carrier means and its connected rod portion.

3. The apparatus of claim 1, wherein said actuator means and a carrier means have laterally extending surfaces engageable with each other after relative lateral motion for moving said carrier means towards and away from said mold sections.

4. The apparatus of claim 1, wherein a guide means for a said carrier means extends downwardly from each mold section.

5. The apparatus of claim 4, wherein said actuator means and a carrier means have laterally extending surfaces engageable with each other after relative lateral motion for moving said carrier means towards and away from said mold sections.

6. The apparatus of claim 5, wherein:
   one of said mold sections is mounted on a stationary support and the other of said mold sections is moved towards and away from said support by an actuating device, and
   said actuating means for moving the carrier means is mounted on said stationary support.

7. The apparatus of claim 1 wherein:
   said biasing means comprises a spring acting between each carrier means and its connected rod portion,
   a guide means for a said carrier means extends downwardly from each mold section,
   said actuator means and a carrier means have laterally extending surfaces engageable with each other after relative lateral motion for moving said carrier means towards and away from said mold sections,
   one of said mold sections is mounted on a stationary support and the other of said mold sections is moved towards and away from said support by an actuating device, and
   said actuating means for moving the carrier means is mounted on said stationary support.

8. The method of blow molding an integral plastic container having a body portion, an open top portion and a closed bottom portion including a protuberance extending upwardly into the interior of the container and tapering towards its upper end, comprising the steps of:
   placing a deformable plastic parison between separated mold sections configured to form said body portion, said top portion and a downwardly extending base portion tapering towards its lower end;
   closing the mold sections to cut off the parison at the top and bottom of the mold;
   blowing the parison to expand it into contact with the mold;
   then releasing the blowing pressure; and
   after the blowing pressure is released and while the plastic remains deformable raising core rod means having a vertical side wall to push said downwardly extending base portion into the body of the container to form said upwardly extending protuberance tapering towards its upper end, the top of the core rod means forming a bottom part of the mold, the relationship of the upwardly extending protuberance and the core rod means being such that the upwardly extending protuberance lacks complete conformance to said core rod means.

References Cited

UNITED STATES PATENTS

| | | | |
|---|---|---|---|
| 3,050,808 | 8/1962 | Clanton et al. | 425—121 X |
| 3,363,282 | 1/1968 | Hagen | 425—216 |
| 3,443,628 | 5/1969 | Carr | 425—444 X |
| 2,009,761 | 7/1935 | Calderara | 215—1 C UX |
| 2,268,993 | 1/1942 | Sanders | 215—1 C UX |
| 2,899,110 | 8/1959 | Parker | 215—1 C UX |
| 3,143,420 | 8/1964 | Swanson et al. | 215—1 C UX |

FOREIGN PATENTS

| | | | |
|---|---|---|---|
| 911,228 | 11/1962 | Great Britain | 264—98 |
| 1,001,672 | 8/1965 | Great Britain | 264—98 |
| 220,099 | 11/1957 | Australia | 264—98 |
| 1,288,010 | 2/1962 | France | 264—98 |

JAN H. SILBAUGH, Primary Examiner

U.S. Cl. X.R.

264—296; 425—387 B, 398, 457, Dig. 205, Dig. 214